United States Patent [19]

Molaug

[11] Patent Number: 5,749,397
[45] Date of Patent: May 12, 1998

[54] PIPE TRACTOR

[76] Inventor: Ole Molaug, Tytebærholen 30, N-4340 Bryne, Norway

[21] Appl. No.: 446,879

[22] PCT Filed: Nov. 30, 1993

[86] PCT No.: PCT/NO93/00180

§ 371 Date: May 30, 1995

§ 102(e) Date: May 30, 1995

[87] PCT Pub. No.: WO94/12827

PCT Pub. Date: Jun. 9, 1994

[30] Foreign Application Priority Data

Dec. 1, 1992 [NO] Norway ................................. 924621

[51] Int. Cl.⁶ ...................................................... B05B 7/04
[52] U.S. Cl. ........................ 138/89; 15/104.05; 104/138.2
[58] Field of Search ............................... 138/89, 98, 97; 15/104.31, 104.13, 104.05; 104/138.2; 378/60

[56] References Cited

U.S. PATENT DOCUMENTS

| | | | |
|---|---|---|---|
| 3,089,434 | 5/1963 | Andreasen | 104/138.2 |
| 3,890,905 | 6/1975 | Clavin | 104/138.2 |
| 4,012,677 | 3/1977 | Rist et al. | 318/149 |
| 4,055,315 | 10/1977 | Gvelesiani et al. | 104/138.2 X |
| 4,763,376 | 8/1988 | Sprulock, Jr. et al. | 15/104.31 |
| 4,862,808 | 9/1989 | Hedgcoxe et al. | 104/138.2 |
| 4,941,511 | 7/1990 | Johansen et al. | |
| 5,146,644 | 9/1992 | Crocco | 15/104.31 X |

FOREIGN PATENT DOCUMENTS

| | | | |
|---|---|---|---|
| 0461964 | 12/1991 | European Pat. Off. | |
| 3206033 | 2/1982 | Germany | |
| 283564 | 11/1990 | Japan | 104/138.2 |
| 391764 | 2/1977 | Sweden | |
| 409301 | 8/1979 | Sweden | |
| 481748 | 12/1972 | U.S.S.R. | |
| 1251976 | 8/1983 | U.S.S.R. | |
| 1328886 | 9/1973 | United Kingdom | |
| 2122713 | 1/1984 | United Kingdom | |
| 2196715 | 5/1988 | United Kingdom | |
| 2200970 | 8/1988 | United Kingdom | |

*Primary Examiner*—Patrick F. Brinson
*Attorney, Agent, or Firm*—Palmatier, Sjoquist, Helget & Voigt, P.A.

[57] ABSTRACT

A pipe tractor is adapted to run internally in channels and pipes in that the pipe tractor's end pieces are counterrotating and provided with resilient arms to which are attached inclined wheels resting against the inner surface of the pipe, wherein lateral force acting on the wheels gives propulsion to the pipe tractor when the end pieces rotate.

4 Claims, 4 Drawing Sheets

PIPE TRACTOR

BACKGROUND OF THE INVENTION

The invention relates to a self-going pipe tractor for use internally in channels, particularly oil wells.

Often, it is necessary to perform inspection, maintenance and other work within pipes and channels where it is impossible for people to reach. In connection with inspection, maintenance and operation of an oil well, log equipment and devices such as plugs and valves are lowered down into the oil well.

Gradually, it has been common to drill oil wells having long horizontal or approximately horizontal courses, so that it is no longer possible to lower down necessary equipment in the entire length of the well by means of gravity alone.

It is known to use pole pipes in order to carry equipment through horizontal or approximately horizontal courses, and this is a commonly used method. Various hydraulic methods for pumping the equipment forward have also been tried.

The use of pole pipes has several disadvantages. Firstly, several kilometers of continuous pipe are required, usually in the form of a large coil or stored on a drum, requiring substantial space. Secondly, special equipment is required in order to handle the pipe coil or drum during operation. Pumping is only possible when circulation can be established. Normally, this is not the case; however, upon installation of special circulation pipes, circulation may be provided in some relations.

SUMMARY OF THE INVENTION

The object of the invention is to provide a pipe tractor which by means of its own propulsion can convey tools and equipment internally in channels.

In accordance with the invention, the object is achieved through features as defined in the following claims.

BRIEF DESCRIPTION OF THE DRAWING

In the following, two embodiment examples of the invention are described, reference being made to the attached diagrammatical drawings, wherein.

DESCRIPTION OF THE PREFERRED EMBODIMENT

Figure 1:
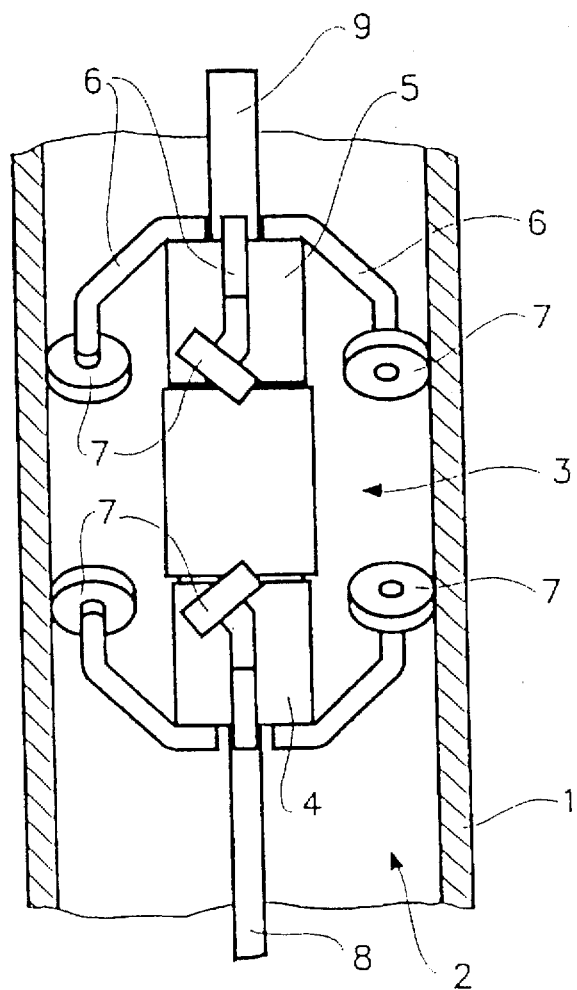
FIG. 1 shows, in side elevational view and partly in section, a pipe wherein a pipe tractor has been placed.
Figure 2:
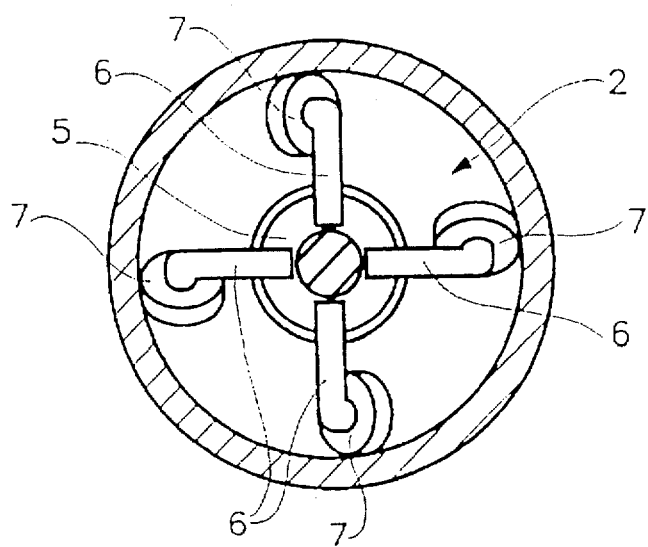
FIG. 2 shows substantially the same as FIG. 1, but seen from one end.

In FIG. 1, reference numeral 1 denotes a pipe wherein is placed a pipe tractor 2, which has an intermediate section 3 and two counterrotary end pieces 4 and 5. To each end piece 4, 5, a number of resilient arms 6 are attached, to which inclined wheels 7 have been attached, said wheels 7 being urged against the internal face of the pipe 1. A cable 8 carries electric power control signals to the pipe tractor 2 through a tubular, centrically positioned shaft 9. Due to the inclination of the wheels 7, the pipe tractor 2 will run along the pipe when the end pieces are rotated, using mutually opposite rotational directions. Upon alteration of rotational direction of the end pieces 4, 5, the pipe tractor 2 may be brought to run along the pipe in an optional direction. When running within pipes 1 having a uniform internal cross-section, the end pieces 4, 5 will rotate with the same speed, but in opposite directions, when passing through cross-sectional changes within the pipe 1, the arms 6 will resile more or less outwardly. In order to achieve equal transport speed on all wheels 7, the rotational speed of the end pieces 4, 5 may be controlled at the same pace as the resilient movements of the arms 6 by means of a variator, not shown. Equal transport speed on all wheels 7 is necessary in order to prevent rotation of the intermediate section 3.

Figure 3:
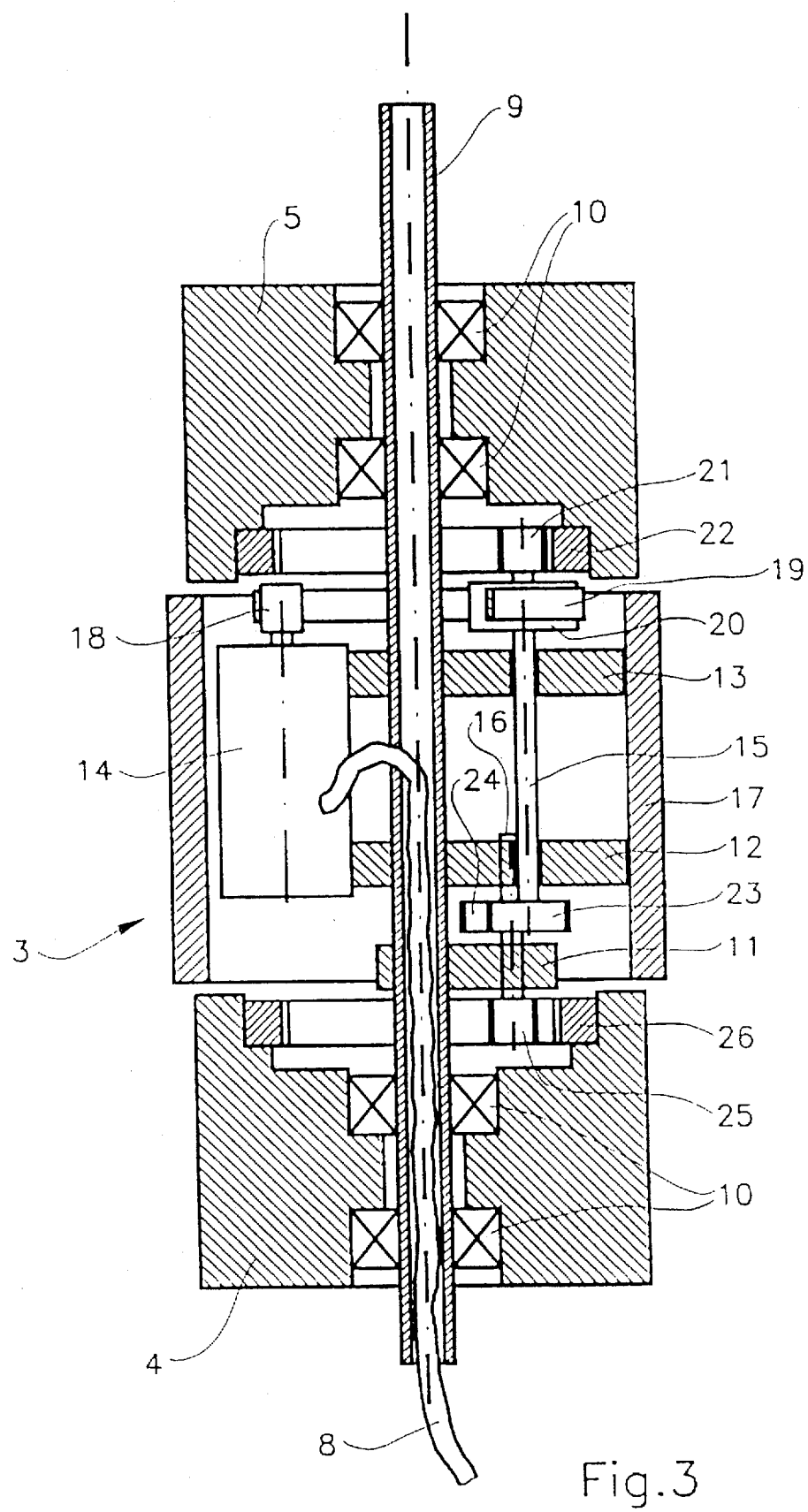
FIG. 3 shows, on a larger scale, parts of a well tractor together with motor and transmission, as seen in a side elevational view, partly in section.
Figure 4:
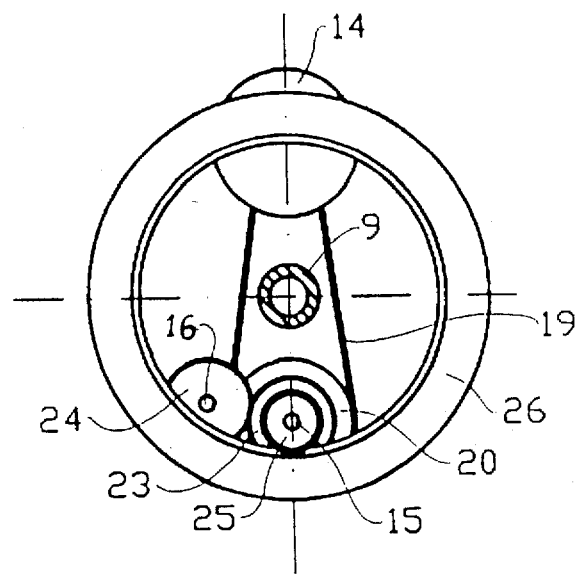
FIG. 4 shows, in a simplified view, a drive arrangement for the well tractor's one end piece, as seen from one end.
Figure 5:
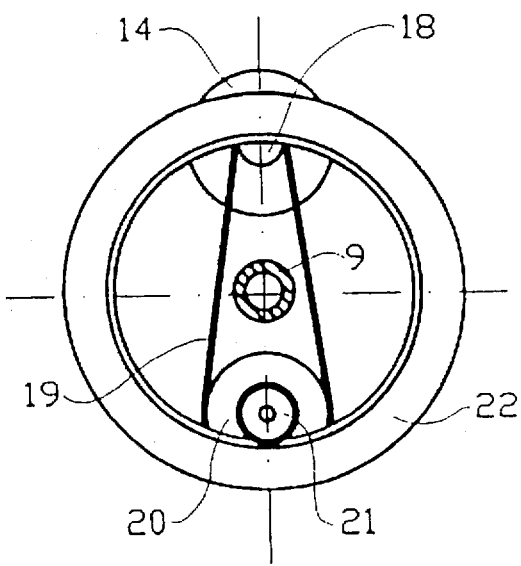
FIG. 5 shows, in a simplified view, a drive arrangement for the well tractor's other end piece, as seen from the other end.

In FIG. 3, the pipe tractor 2 has been shown sectioned in a side elevational view, arms 6 and wheels 7 being omitted. The end pieces 4 and 5 are mounted on the shaft 9 by means of bearings 10 and axially secured to the shaft 9 by means of locking rings, not shown. Attachment brackets 11, 12, 13 are rigidly connected to the shaft 9 and adapted to carry an electric motor 14, a transmission shaft 15 and a drive shaft 16, as well as a cover 17. The cable 8 carries current and control signals to the motor 14 which, through a first belt pulley 18, a belt 19 and a second belt pulley 20, is adapted to drive the transmission shaft 15. Power from the transmission shaft 15 is transferred to a first gear wheel 21 meshing with a first toothed rim 22 attached within the rotary end piece 5. Also, power is transferred through a gearing 23, 24 to the drive shaft 16 and further to a second gear wheel 25 meshing with a second toothed rim 26 attached to the rotary end piece 4. The gearing 23, 24 serves to reverse the rotational direction of the gear wheel 25 in relation to the gear wheel 21. The gear wheels of the gearing 23, 24 are of equal size and give, therefore, no change of speed. When the motor 14 rotates, the end piece 5 rotates in the same rotational direction as the motor 14, the end piece 4 rotating in the opposite rotational direction. The positioning of the components of the transmission in relation to the shaft 9 is shown as seen from the end piece 4 in FIG. 4 and as seen from the end piece 5 in FIG. 5.

Figure 6:
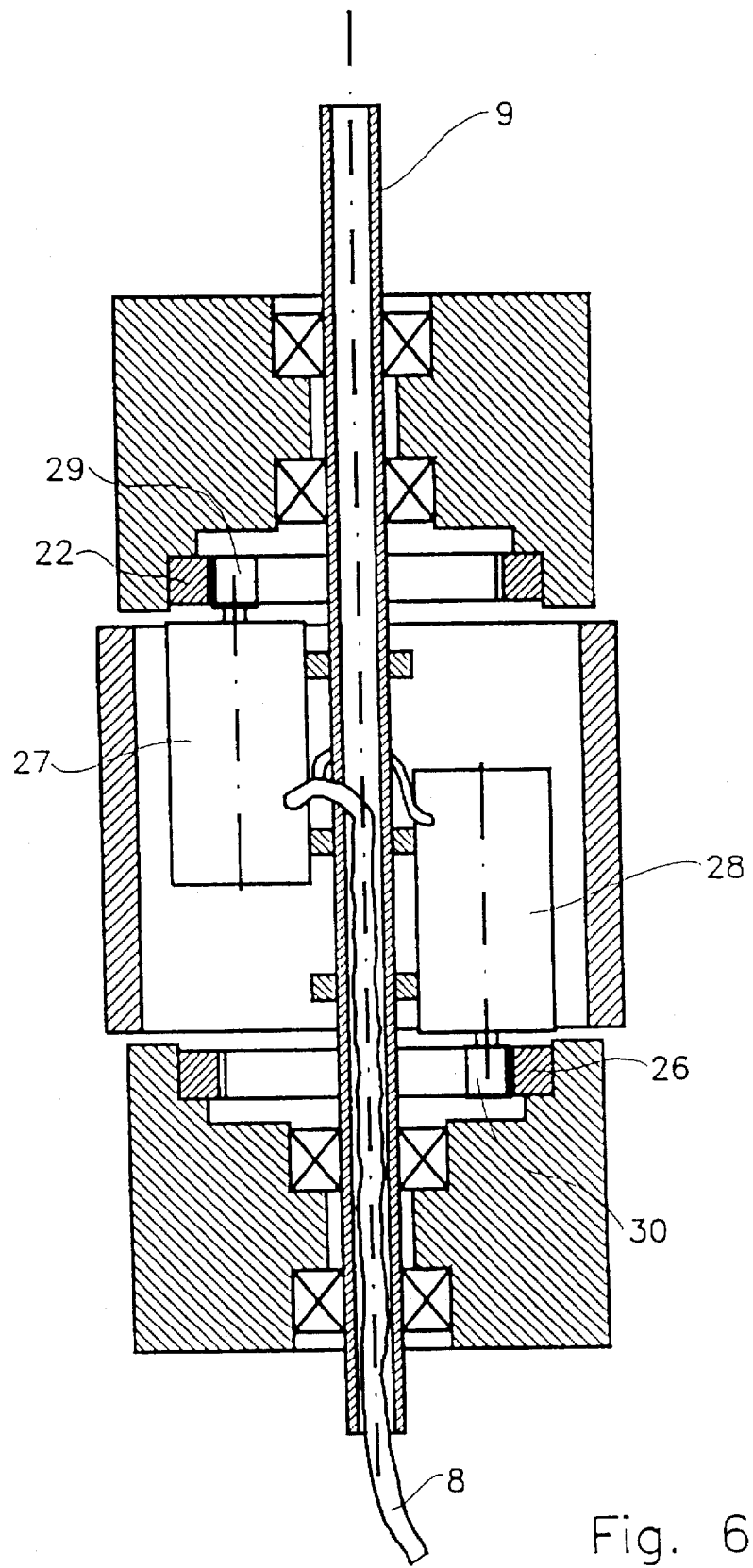
FIG. 6 shows, on a larger scale, a portion of a well tractor having two motors and transmissions, as seen in a side elevational view, partly in section.

FIG. 6 shows an alternative transmission having two electric motors 27, 28, each carrying a gear wheel 29, 30, each driving a toothed rim 22, 26. With separate speed control of the motors 27 and 28, the number of revolutions per minute of the end pieces 4, 5 may individually adjust itself to the internal pipe circumference against which the respective wheels 7 rest, see FIG. 1. The pipe tractor 2 may be imagined used for operations wherein the intermediate section 3 with the cover 17 advantageously may rotate while the pipe tractor 2 is running. Such rotation of the intermediate section 3 can be achieved by giving the end piece 4 and the end piece 5 different transport speeds, e.g. by giving the motors 27, 28 different numbers of revolutions per minute, and the intermediate section 3 will then rotate with a speed proportional with the difference. If the intermediate section is to rotate many revolutions in one direction, electric power and control signals should be transferred from the cable 8 to the intermediate section 3 and the motors 27, 28 through sliding contacts. Running the motors 27, 28 in the same direction will keep the pipe tractor 2 in place, simultaneously as the intermediate section 3 rotates.

The intermediate section 3 may contain control systems for the motors 27, 28 and additionally be adapted to carry sensors and inspection equipment as well as other equipment for use within a pipe 1.

The invention is not restricted to the embodiments shown. It goes without saying that the pipe tractor 2 e.g. may be operated by means of hydraulic motors. The traveling speed of the pipe tractor 2 depends on the internal cross-section of the pipe 1, the rotational speed of the end pieces 4, 5 and the inclination of the wheels 7; and the same traveling speed may be achieved by means of an infinite number of combinations of said quantities. The tractive power of the pipe tractor 2 depends on the accumulated friction forces between the pipe 1 and the wheels 7. The tractive power may be increased if the number of wheels 7 is increased.

I claim:

1. A pipe tractor adapted to move along a bore axis internally within a pipe or channel comprising a chassis body positioned on a longitudinal axis which is alignable along said bore axis, said chassis body carrying at least one rotary power source; a pair of rotatable housings, each respectively positioned axially adjacent the chassis body, and means for connecting said at least one rotary power source to said rotatable housings to cause respective rotation about said longitudinal axis; a set of resilient arms connected to each of said rotatable housings, the respective arms in said set being arranged at approximate equal angular displacements about said longitudinal axis, and each resilient arm having an outer rotatable wheel aligned at a bevel angle relative to said longitudinal axis; whereby said wheels follow respective helical paths within said pipe or channel when said rotary power source is actuated to rotate said rotatable housings.

2. The apparatus of claim 1, wherein each set of resilient arms further comprise four arms spaced at ninety degree displacements about said longitudinal axis.

3. The apparatus of claim 2, wherein said rotary power source further comprises a bi-directional rotary power source.

4. The apparatus of claim 3, wherein said at least one rotary power source further comprises two rotary power sources.

* * * * *